Dec. 26, 1950     O. E. HERMANNS     2,535,132
INJECTION MOLD
Filed Aug. 9, 1947
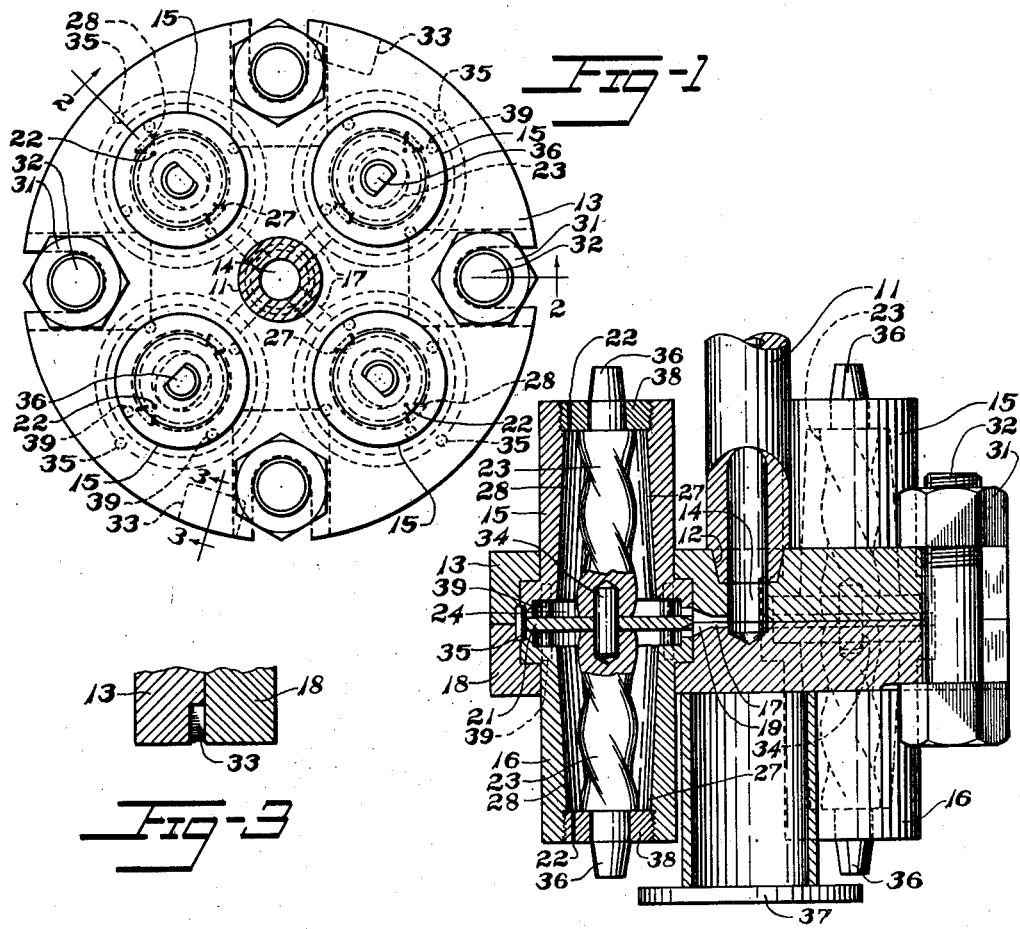
Inventor
Otto E. Hermanns
By Robert W. Furlong
Atty.

Patented Dec. 26, 1950

2,535,132

UNITED STATES PATENT OFFICE 2,535,132

INJECTION MOLD

Otto E. Hermanns, Akron, Ohio, assignor to The B. F. Goodrich Company, New York, N. Y., a corporation of New York Application August 9, 1947, Serial No. 767,790

6 Claims. (Cl. 18—34)

1

This invention relates to injection molding of thermoplastic material and more specifically to injection molding of rubber articles and the elimination of any rind or seam from the molded product.

An object of this invention is to provide a sectional mold which is easily assembled and disassembled and which is suitable for injection feeding from a common injection nozzle to a multiplicity of cavities. It is a further object to so arrange the cavities that the number of necessary passages for the injected rubber will be at a minimum.

These objects are attained by the use of a multi-cavity, sectional mold that is designed in such a manner that a minimum number of fasteners is used to secure the sections in their proper position and that one radially extending passageway or gate suffices for each pair of cavity sections.

Such a mold may be more completely described by referring to the accompanying drawing, in which a preferred embodiment of the invention is shown.

In Fig. 1, a top view of a mold is shown with four securing bolts spaced equi-distant around the edge of the plate members;

Fig. 2 is a cross-section on line 2—2 of Fig. 1;

Fig. 3 is a cross-section on line 3—3 of Fig. 1; and

Fig. 4 is a perspective view of the finished article which may be produced in the mold.

The mold has a standard 37 which supports the lower clamping member 18. The upper and lower cavity members 15, 15, 16, 16 are secured in pairs and in an end-to-end abutting relationship by the upper and lower clamping members 13 and 18, respectively. The upper and lower clamping members 13 and 18 are secured together by means of four bolts 32, 32 and nuts 31, 31, and are also provided with slots 33, 33 at their periphery to facilitate prying these members apart in order to open the mold. Clamping member 13 has a drilled passage at the center which acts as a common gate 14 for the injection of a thermoplastic, and also has, in conjunction with the common gate 14, a receiving port 12 which is tapered and is shaped in such a manner as to mate with the nose of an injection nozzle 11. From this common gate 14 articulated gates 17, 17 extend out to the pairs of cavity members 15, 15, 16, 16. The gates 17, 17 are contained partially in upper clamping member 13 and partially in lower clamping member 18 and the two semi-cylindrical sections make

2 a complete cylindrical passage when clamping members 13 and 18 are secured together. The flared portion 19 of the articulated gate 17 is divided by plate member 21 to form a divided passage, one division going to cavity member 15 and the other to cavity member 16. Plate member 21 also serves to divide the pair of cavity sections 15, 16. Plate member 21 is provided with a hole at its center in which centering pin 34 may be inserted. Plate member 21 is centered also by the eight pins 39, 39; four pins being press fitted into each of the cavity sections 15, 15, 16, 16. The pins 39, 39 are flush with the flat surfaces of plate member 21. Plate member 21, cavity members 15, 16, and upper and lower clamping members 13, 18 are so drilled that locking pin 35 may be placed in position as shown in Fig. 2. The helical shaped cores 23, 23 are held in position by pin 34 and flat screw plug 38. The outer end 36 of the helical core 23 is tapered and may be let into the flat screw plug 38. Flat screw plug 38 has a drilled vent passage 22 which passes completely through the screw at a point near the outer edge.

The mold may be assembled as follows: Lower clamping member 18 with the four press fitted cavity sections 16, 16 in position is placed on standard 37. Flat screw plug 38 remains in place as shown in Fig. 2. Lower helical core 23, with the press fitted pin 34 in position, is then put into place by inserting the tapered outer end 36 in the flat screw plug 38 and gently tapping with a mallet on the inner end of core 23. Plate member 21 is placed over pin 34 and then plate member 21, cavity member 16, and lower clamping member 18 are positioned in proper relationship to each other so that pin 35 may be put into place. The four pins 39, 39 remain in cavity section 16 and help support plate member 21. These pins 39, 39 form the four holes 40, 40 in the finished article 26. The upper core 23 is then placed over the pin 34. The upper clamping member 13 with the four press fitted cavity sections 15, 15 in position is then placed over the lower clamping member 18. The upper clamping member 13 and the lower clamping member 18 are then secured together by means of four bolts 32, 32. The mold is now ready for use.

In one embodiment of my invention the mold described may be used as follows. An injection nozzle 11 of an injection cylinder (not shown) may be placed in the receiving port 12 which is located preferably at the center of the upper clamping member 13 so that the common gate 14 is approximately equi-distant from the four pairs of cavity members 15, 16. In Fig. 2 the injection nozzle 11 is shown seated in the receiving port 12 of the mold.

The pre-heated rubber or other thermoplastic is then injected under pressure through the nozzle 11 into the common gate 14 and then passes through the four articulated gates 17, 17 to the eight cavities 15, 15, 16, 16. Each of the four articulated gates 17, 17 flares out at the outer end to feed two of the cavity members simultaneously. For instance, gate 17 feeds both cavity member 15 and cavity member 16, the upper and lower cavities respectively of one of the four pairs of cavity members.

While the occluded air in the mold escapes through the exhaust ports 22, 22, the pre-heated rubber under pressure fills the eight cavity members 15, 15, 16, 16. In cavity member 15 the rubber forms around the helical core 23 and fills the enlarged mold portion 24 to form a circular flange 25 on the finished article 26. The rubber also fills both the dovetailed keyways 27, 28 and each cavity member to give the finished product 26 a longitudinal key 29 on either side.

When all eight cavity members are filled, the mold and the injected rubber are heated to a temperature at which the rubber is vulcanized. After vulcanization the mold is opened and unloaded. The four nuts 31, 31 are removed from the four securing bolts, 32, 32. The upper and lower clamping members 13 and 18 are then pried open by inserting a bar in the two prying slots 33, 33.

When the upper and clamping members are separated, the helical cores 23, 23 in the finished rubber articles 26, 26 remain in the respective cavity members 15, 15, 16, 16. The plate 21 and pin 35 may easily be disassembled, and the helical core 23 may then be tapped on the outer tapered end 36 to effect removal of the core 23 and finished article 26 from the cavity member. The finished article 26 may then be twisted off the core 23.

Although a particular mold has been described, it should be noted that a single cavity mold or a mold having any number of cavities in a similar arrangement as outlined may be used. A multicavity mold of the type described is easily assembled and disassembled because the number of fasteners has been reduced to a minimum through the use of clamping members which hold the abutting cavity members against each other. The resulting product needs very little trimming since the product has no rind. Such a sectional mold as the one described makes it possible to form relatively large finished articles without the necessity of using large and cumbrous molds.

While I have herein disclosed certain specific embodiments of my invention, I do not intend to limit myself solely thereto but to include all of the obvious modifications and variations falling within the spirit and scope of the appended claims.

I claim:

1. A sectional injection mold comprising a plurality of mold members, each said member having an elongated molding chamber, clamping means for clamping pairs of said members together with said chambers in opposing end-to-end relationship on a common axis, the parting line of said mold lying between said opposed chambers and extending transversely to said common axis, and separator means for separating each said chamber from its opposed chamber to permit the formation of an individual molded object in each said chamber, said clamping means including a passageway for supplying molding material to both said opposed chambers simultaneously at their point of junction.

2. A sectional injection mold comprising a plurality of mold members, each said member having an elongated molding chamber, clamping means for clamping pairs of said members together with said chambers in opposing end-to-end relationship on a common axis, the parting line of said mold lying between said opposed chambers and extending transversely to said common axis, and separator means for separating each said chamber from its opposed chamber to permit the formation of an individual molded object in each said chamber, said clamping means including a receiving port located equi-distant from each of said opposed molding chambers and branched gates leading from said receiving port to said molding chambers.

3. A sectional injection mold comprising a plurality of mold members, each said member having an elongated molding chamber, clamping means for clamping pairs of said members together with said chambers in opposing end-to-end abutting relationship on a common axis, the parting line of said mold lying between said opposed chambers and transverse to their common axis, said clamping means including a receiving port located equi-distant from each of said opposed molding chambers and a common gate communicating with each pair of said chambers and separator means for separating each said chamber from its opposed chamber to permit the formation of an individual molded object in each said chamber, said separator means extending into and dividing said gate at the mouth of said gate.

4. A mold comprising a plurality of mold members, each said mold member having an open-faced molding chamber, clamping means for clamping pairs of said members together with the open faces of said chambers in opposing relationship, the parting line of said mold lying between said opposed chambers, separator means for separating each said chamber from its opposed chamber to permit the formation of an individual molded object in each said chamber, and means for injecting a molding material into both said opposed chambers simultaneously at their point of junction.

5. A mold comprising a plurality of mold members, each said mold member having an open-faced molding chamber with a core member therein, clamping means for clamping pairs of said members together with the open faces of said chambers in opposing relationship, the parting line of said mold lying between said opposed chambers, separator means for separating each said chamber from its opposed chamber to permit the formation of an individual molded object in each said chamber, said separator means engaging said core member and centering the core in said molding chamber, and means for injecting a molding material into both said opposed chambers simultaneously at their point of junction.

6. A mold comprising a plurality of mold members, each said mold member having an open-faced molding chamber, a pair of clamping members for clamping pairs of said mold members together with their open faces in opposing relationship and with said pairs of mold members disposed radially equi-distant from a common axis passing through said clamping members, the parting line of said mold lying between said opposed chambers and between said clamping members, separator means for separating each said chamber from its opposed chamber to permit the formation of an individual molded article in each said chamber, a port in one of said clamping members disposed at said common axis, and a gate extending along the parting line of said mold from said port to each said pair of opposed molding chambers at their junction for supplying molding to both said opposed chambers simultaneously.

OTTO E. HERMANNS.

REFERENCES CITED

The following references are of record in the file of this patent:

UNITED STATES PATENTS

| Number | Name | Date |
| --- | --- | --- |
| 750,406 | Simon | Jan. 26, 1904 |
| 1,997,074 | Novotny | Apr. 9, 1935 |
| 2,217,661 | Anderson | Oct. 15, 1940 |
| 2,253,611 | Davis | Aug. 26, 1941 |
| 2,443,826 | Johnson | June 22, 1948 |